United States Patent Office 3,422,680
Patented Jan. 21, 1969

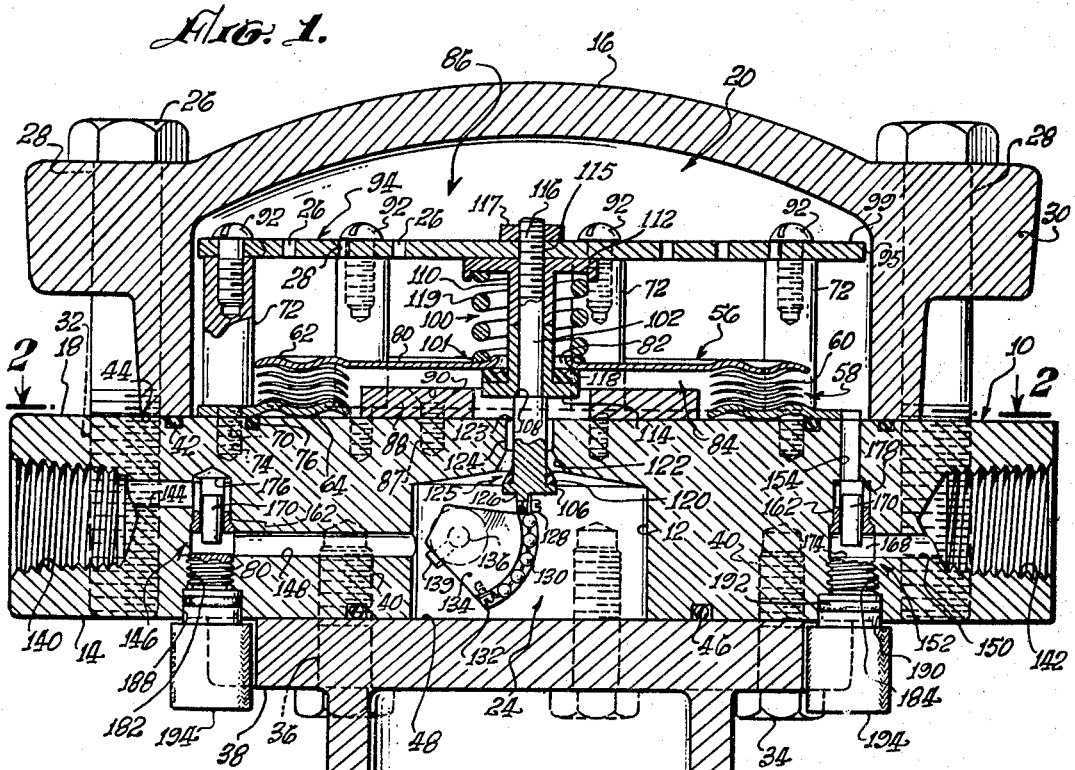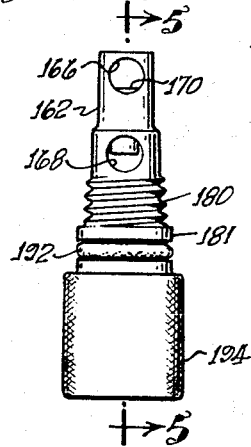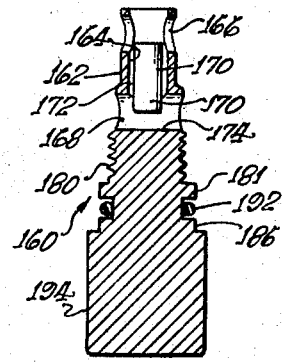

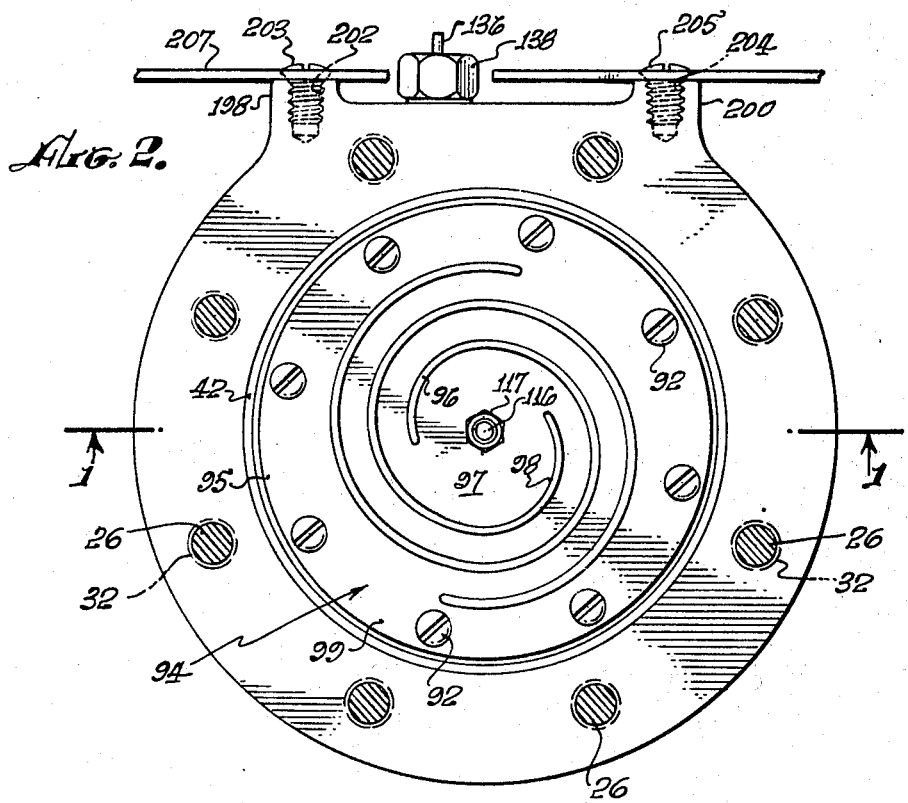
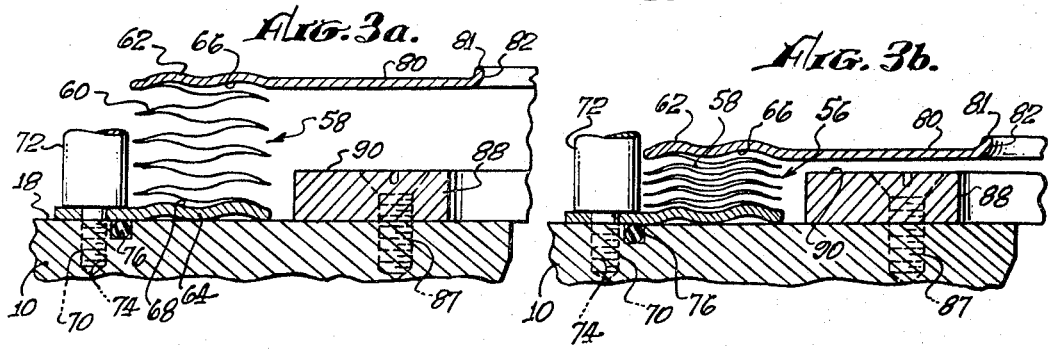

3,422,680
DIFFERENTIAL PRESSURE-RESPONSIVE DEVICE
Claude B. Nolte, Placentia, Calif., assignor to Kingmann-White, Inc., Placentia, Calif., a corporation of Texas
Filed Jan. 18, 1967, Ser. No. 610,109
U.S. Cl. 73—407                        17 Claims
Int. Cl. G01l *13/02;7/06*

ABSTRACT OF THE DISCLOSURE

A differential pressure-sensing device employing a differential pressure-responsive element such as a metal diaphragm or bellows, across which variable differential pressures are applied, and which includes a valving mechanism for protecting the pressure-responsive element from inadvertent applications thereacross of damaging differential pressures. The safety mechanism includes a normally open valve in the inlet to the interior, normally high pressure side of the pressure-sensing element, which is coupled to the movable portion thereof such as to be mechanically closed in response to a predetermined maximum deflection or expansion of the pressure-sensing element. The safety mechanism also includes a normally closed relief valve carried on the movable portion of the sensing element such as to be automatically opened in response to such predetermined maximum deflection or expansion of the pressure-sensing element, to permit escape of pressure from the normally high pressure to the normally low pressure side thereof, thereby preventing expansion of the pressure-sensing element beyond such predetermined maximum, in event of pressure build up on the normally high pressure side or reduction in pressure on the normally low pressure side thereof following such closure of the inlet valve. The relief valve is also constructed such as to be automatically opened by differential pressure thereacross in event of reversal of the normal differential pressures, and the pressure on the normally low pressure side exceeds the pressure on the normally high pressure side of the pressure-responsive element by a predetermined maximum value.

BACKGROUND OF THE INVENTION

This invention relates generally to bellows types of differential pressure measuring devices such as employed in connection with fluid flow meters, and more particularly to mechanisms included in such measuring devices for protecting the bellows from damage caused by inadvertent application thereto of excessive differential pressures.

As is well known in the art, differential pressures derived from orifices, venturi tubes and the like apparatus, may be employed to determine the rate of flow of fluids through conduits. Also, differential pressures may be employed to determine the level of fluids within closed tanks, as well as pressure drop or pressure increase across fluid-handling apparatus such as filters, scrubbers, pumps, or compressor. Of the many known types of apparatus for differential pressure measurement, or for actuation of measurement devices in response to differential pressures, such as for example, mercurial or water manometers and elastic metallic membranes or diaphragms, those based on the principal of the deflection of a single, elastic metal bellows across which the differential pressures to be sensed are directly applied have been found to offer the greatest advantages in structural simplicity and operational sensitivity and accuracy.

However, such metal bellows devices have the disadvantage of being extremely sensitive and susceptible to damage or destruction by inadvertent application thereto of excessive differential pressures. The vulnerability of such bellows devices to such damage is apparent when it is considered that the magnitude of the operative differential pressures usually to be sensed by the diaphragm or bellows element in most conventional industrial applications, is extremely low as compared to the absolute pressures which the fluids involved and to which they are connected may have. For example, the maximum typical pressure differential required to be sensed by a conventional bellows device may be from approximately 3.0 to 4.00 p.s.i., whereas the static pressures which the fluid may have from which such differential pressures are derived, may be of the order of from 100 to 1,000 times as great.

It is obvious, therefore, that the slightest error in applying the pressures from the pressure differential generation means to the differential pressure measurement sensor, or the slightest mishap to one or other of the connections thereto can result in the application of an intense differential pressure overload to the bellows element, far beyond its normal working range, resulting in its permanent damage or immediate complete destruction.

Many devices have heretofore been employed for the purpose of providing protection for such sensitive bellows apparatus against inadvertently applied, excessive pressure overloads, or, conversely, to develop a bellows structure that would be insensitive to such overloads, or both.

An example of a typical bellows meter construction heretofore extensively used and incorporating means for protecting the bellows from the damaging effects of such excessive differential pressures, is that which employs a pair of oppositely positioned, base-to-base internally interconnected bellows which are entirely filled with a permanently sealed-in, relatively incompressible supporting body of liquid, and to the opposite exteriors of which are applied the total pressures, the differences of which are to be sensed. Valve means are provided in the interconnection between the two opposite bellows which are normally open, permitting the liquid to flow from one bellows to the other in response to corresponding deflection of the bellows in response to varying differential pressures applied to them, but which close off the interconnection when the deflection of the pair of bellows in either direction reach a predetermined maximum in response to an excessive differential pressure. The externally applied pressures are thus supported by the liquid contained in the bellows, and in event of application of an excessive, unbalanced differential pressure across the bellows in either direction, the bellows are deflected to the limit determined by the closure of the interconnecting valve means and thereafter the excessive pressures in the high pressure side of the pair of bellows is supported by the relatively incompressible liquid contained and entrapped therein by the valve means. Such bellows devices employing permanently sealed-in incompressible supporting liquids are for convenience referred to herein as being liquid-filled.

Such liquid-filled differential pressure-sensing device have proven to be overly complicated and lacking in the degree of sensitivity, reliability and effectiveness desired. One serious disadvantage of the liquid-filled type of differential pressure-sensing device resides in the considerable practical difficulty encountered in maintaining such bodies of liquid free from entrance thereinto or formation herein of gas bubbles, which destroy the effective incompressibility and thereby impair the bellows-supporting action of the liquid. Another disadvantage of such liquid-filled devices resides in the impracticability of servicing, repairing or replacing the liquid-filled bellows components in the field and without returning such components to the manufacturer.

The foregoing is not to be construed as excluding the presence of actuating liquid from the bellows device of the invention herein described, for the fluid contained in, and under some circumstances passing through the pressure-sensing device of this invention may be either gas or liquid, depending upon whether the fluid from which the pressures are derived is gas or liquid. However, the apparatus of the invention hereindescribed does not employ, and obviates the disadvantageous necessity of employing any permanently sealed-in body of supporting liquid within the bellows.

SUMMARY OF THE INVENTION

It is accordingly an object of this invention broadly to provide a differential pressure-sensing device incorporating an improved protective mechanism for automatically preventing damaging of the pressure-responsive element which would otherwise result from inadvertent applications thereacross of excessive differential pressures;

It is another object of this invention to provide a differential pressure-sensing device incorporating a protective mechanism for automatically limiting the differential pressure applicable across the pressure-responsive element to a value which limits the deflection thereof to a predetermined maximum;

It is another object of this invention to provide a differential pressure-sensing apparatus employing a single, non-liquid-filled, pressure-sensitive diaphragm or bellows device incorporating a protective mechanism for automatically limiting the differential pressure applied across such diaphragm or bellows device to a predetermined maximum value.

It is another object of this invention to provide a pressure-pulsation dampening mechanism in combination with a differential pressure-sensing device for minimizing the effects of differential pressure pulsations; and It is a further object of this invention to provide a differential pressure-sensing device having a structure which provides for facilitating the servicing and adjustment of the mechanism thereof and without the necessity of any mechanical disconnection or disassembly of the differential pressure connections or the return of any of the pressure-sensing mechanism elements to the manufacturer for repairs.

The invention resides broadly in combination with a sensitive diaphragm or metal bellows type of non-liquid filled differential pressure-sensing device, of means responsive to expansion of the pressure-sensing device automatically to limit the pressure differential applied thereacross such as to limit such expansion to a predetermined maximum. More specifically, the invention includes relief valve means positively responsive to the expansion movement of the pressure-sensing device to relieve the pressure from the inside to the outside of the pressure-sensing device, when the expansion thereof reaches a predetermined maximum, and also substantially simultaneously therewith to shut off access of the fluid pressure to the inside of the pressure-sensing device thereby cooperating with the relief valve means in limiting the expansion or deflection of the device such as not to exceed a predetermined maximum less than that which would result in permanent damage.

The invention also resides in an improved arrangement of fluid pressure pulsation dampening means for limiting the intensity of fluid pressure pulsations applied across the pressure-sensing element.

These and other objects, advantages and features of novelty will be evident hereinafter.

BRIEF DESCRIPTION OF THE SEVERAL VIEWS OF THE DRAWING

In the drawing which illustrates a presently preferred embodiment of the invention and in which similar reference characters designate the same or similar parts throughout the several views:

FIGURE 1 is a vertical, sectional view of the pressure-responsive apparatus assembly embodying the invention, such view corresponding to that taken on a vertical plane passing through line 1—1 of FIGURE 2;

FIGURE 2 is a cross-sectional view, of slightly reduced size, taken on line 2—2 of FIGURE 1 with portions of the apparatus elements therein shown in elevation;

FIGURE 3a is an enlarged, fragmentary, detailed, sectional view of a portion of the bellows mechanism shown generally in FIGURE 2, the bellows being in partially expanded condition;

FIGURE 3b is a view of the same apparatus shown in FIGURE 3a but with the bellows in nearly collapsed condition;

FIGURE 4 is an enlarged detail elevational view of a pressure pulsation snubber assembly, two of which are shown in FIGURE 1; and FIGURE 5 is a vertical sectional view taken on line 5—5 of FIGURE 4.

DETAILED DESCRIPTION

Apparatus

Referring first primarily to FIGURES 1 and 2 of the drawings, the principal housing body components of the apparatus of the invention comprise a relatively thick, substantially disk-shaped metal base plate 10 having a central, downwardly-facing, cylindrical recess 12 formed in the lower surface 14 thereof, a dome-shaped cover 16 sealingly bolted to the upper surface 18 thereof and forming therewith a normally closed head chamber 20, and a combined bottom closure member and supporting fixture 22 sealingly bolted coaxially to the bottom surface 14 of the base plate 10, covering the recess 12 and therewith forming a normally closed base cavity 24.

The dome-shape cover 16 is detachably held in place upon the upper surface 18 of the base plate 10 by means of a plurality of bolts 26 which extend vertically through circumferentially space-apart bolt holes 28 formed through a radially extending marginal rim portion 30 of the cover 16 and into correspondingly positioned, threaded holes 32, provided in the base plate 10. The supporting fixture 22 is similarly attached coaxially to the bottom surface 14 of the base plate 10 by means of a plurality of bolts 34 which extend vertically through circumferentially spaced-apart bolt holes 36 formed through a radially flanged portion 38 of the supporting fixture 22, and into correspondingly positioned threaded holes 40 formed into the lower surface 14 of the base plate member 10.

An O-ring seal 42 is provided between the lower annular edge 44 of the cover 16 and the upper surface 18 of the base plate 10, and an O-ring seal 46 is similarly provided between the upper surface 48 of the supporting fixture 22 and the lower surface 14 of the base plate 10 adjacently surrounding the cylindrical recess 12 therein. The supporting fixture 22 is formed with a coaxial, downwardly directed sleeve portion 50 which provides therein a downwardly facing cylindrical socket 52 for telescopic coupling connection to the upper end of a suitable meter supporting column member, not shown.

Contained within the head chamber 20 formed between the cover 16 and the upper surface 18 of the base plate 10 is a metal bellows assembly shown generally at 56. The bellows assembly 56 comprises a hollow, generally cylindrical metal bellows body 58 composed of a plurality of interconnected, vertically superposed annular folds or convolutions 60, as best shown in FIGURES 3a and 3b. Each of the convolutions 60, as viewed in vertical cross-section, is radially curved in an approximately sinusoidal form such that when the bellows body 58 is in fully collapsed or retracted condition approximating that shown in FIGURE 3b, the adjacent folds 60 are nested upon one another in full surface contact such as to present, in effect, a substantially solid, axially and laterally self-supporting, cylindrical body capable of withstanding external pressures greatly in excess of normal without incurring permanent damage or rupture.

The top and bottom ends of the metal bellows body 58 are attached, by suitable means such as by welding or soldering around the periphery, to generally annular shaped top and bottom end fittings 62 and 64, respectively. The top and bottom end fittings 62 and 64 are formed with oppositely confronting surfaces 66 and 68, respectivley, of radially curved shaped complementary to one another and to the before-described shapes of the respective annular bellows folds 60 immediately adjacent thereto.

The bottom end fitting 64 of the metal bellows assembly 56 it attached to the upper surface 18 of the base plate 10 coaxially within the cover 16, by means of a plurality of circumferentially spaced-apart reduced diametered, threaded lower end portions 70 of a plurality of supporting column members 72, such threaded lower end portions 70 extending into correspondingly positioned, internally threaded holes 74 drilled into the upper surface 18 of the base plate 10 in a bolt circle coaxial with the bellows assembly 56. An O-ring seal 76 is provided between the lower annular surface of the bottom end fitting 64 and the upper surface 18 of the base plate 10 whereby a fluid-tight seal is provided between the stationary bottom end of the metal bellows assembly 56 and the base plate 10.

Extending radially inwardly from the radially inner edge of the bellows top end fitting 62, and preferably formed integrally therewith, is a generally annular-shaped bellows top closure plate 80 having a centrally located valve aperture 82 formed therein, which valve aperture 82 formes a part of a pressure-relief travelling valve 101, hereinafter more fully described. The before-described bellows assembly shown generally at 56, together with the bellows top closure plate 80, serve, when the valve aperture 82 of the travelling valve 101 is closed as shown in FIGURE 1, to divide the head chamber 20 into separate, inner and outer, closed chamber portions as indicated at 84 and 86, respectively, communicating with the inner and outer sides of the beforedescribed bellows assembly 56.

Supported on the upper surface 18 of the base plate 10, coaxially opposite the lower surface of the annular bellows top closure plate 80, and secured in place by a plurality of countersunk head machine screws 87, is an annular stop member 88. The thickness of the stop member 88 is such that when the bellows assembly 56 reaches a fully collapsed position, a little beyond that shown in FIGURE 3b, the lower surface of the closure plate 80 is simultaneously brought into seating engagement with the upper surface 90 of the stop member 88, thereby supporting and relieving the bellows closure plate 80 and top end portion of the bellows body 58 of much of the vertical compressive force and distorting stresses which would otherwise be applied thereto when the differential pressure across the bellows in a collapsing direction is excessive.

Supported upon the upper ends of the before-mentioned supporting column members 72 and attached thereto by a plurality of machine screws threaded into the upper ends of the supporting columns 72, as shown at 92, is a dual-spiral, flat spring shown generally at 94. The flat spring 94 is formed of a relatively thin metal disk 95, through the thickness of which has been cut a pair of generally coaxially extending, spiral slots 96 and 98, whereby the center portion 97 of the disk 95 is rendered axially, resiliently flexible with respect to the supported circumferential, marginal portion 99 thereof.

Fixed to the lower surface of the center portion 97 of the flat spring 94, and vertically movable therewith, is a bellows-relief valve assembly shown generally at 100. The relief valve assembly 100 comprises a coaxially positioned, central valve stem 102 formed at its lower end with a radially-extending annular lower valve flange 106, and carrying on its intermediate section and supported upon an upwardly facing annular shoulder 108, a two-pieced spool-shaped valve body assembly 110 having axially opposite, upper and lower annular flanges 112 and 114, respectively. The upper threaded end portion 116, of the valve stem 102, extends through a hole 115 centrally located in the center portion 97 of the flat spring 94 and is provided with a threaded retainer nut 117 by means of which the before-described relief valve assembly 100 is firmly secured to and depends vertically from the lower surface of the central portion 97 of the flat spring 94. A helical compression spring 119 extends coaxially of the valve stem 102 between the lower surface of the upper annular flange 112 of the spool-shape valve body assembly 110 and the upper surface of the top closure plate 80, adjacently surrounding the upwardly curved margin 81 of the valve aperture 82 therethrough.

The lower annular flange 114 of the spool-shape valve body assembly 110 carries upon its upper surface, an annular valve seal member 118 which, under the bias of the helical spring 119, is normally retained in firmly closed position relative to the valve aperture 82, as shown in FIGURE 1. The annular flange 114, valve seal member 118 and aperture 82 constitute the pressure-relief valve hereinbefore referred to as the travelling valve 101.

The lower end portion of the valve stem 102 extends vertically slidably through an opening consisting of an aperture 124 and adjacent frusto-conical valve seat 122, formed through the center of the base plate 10 and communicating with the upper portion of the base cavity 24. An annular clearance space 123 is provided between the valve stem 102 and the surrounding walls of the aperture 124 and frusto-conical valve seat 122, which clearance space normally serves as a fluid pressure communication channel between the base cavity 24 and the inner chamber portion 84 within the bellows assembly 56. The lower, annular, valve flange 106 carries on the upper side thereof an annular valve seal member 120 adapted to seat upon the adjacently surrounding, frusto-conical valve seat 122 in the base plate 10, and constitutes a pressure inlet control valve indicated generally at 125, adapted to close such communication channel through the annular clearance space 123, except for normal slight manufacturing tolerance bleed, under certain conditions as hereinafter more fully described.

Extending from the lower end of the valve stem 102, below the beforementioned valve flange 106, is an axially extending attachment lug 126 to which is attached by screw 128 one end of a flexible drive chain 130, the opposite end of which is attached by screw 132, to the circular edge portion of a meter-actuating sector 134 contained within the base cavity 24. The meter-actuating sector 134 is drivingly attached by means of a setscrew 139 to the inner end of a meter drive shaft 136 which extends laterally outwardly from the base cavity 24 to the exterior of the base plate 10 through a suitable packing gland 138, as best shown in FIGURE 2.

Entering into the exterior edge portion of the base plate 10 is a pair of threaded, pressure line connector ports 140 and 142. The pressure connector port 140 communicates by way of duct 144, pressure pulsation snubber 146, hereinafter more fully described, and duct 148, with the base cavity 24. The pressure connector port 142 communicates by way of duct 150, a pressure pulsation snubber 152 and duct 154 extending through the upper surface 18 of the base plate 10, with the beforedescribed outer chamber portion 86 on the exterior of the bellows assembly 56.

Referring next primarily to FIGURES 1, 4 and 5, each of the hereinbefore mentioned pressure pulsation dampeners or snubbers 146 and 152 comprise a stepped diametered, generally cylindrical insert plug body shown generally at 160. The insert plug body 160 is formed at its upper end with a reduced diametered, hollow, cylindrical portion 162 having a coaxial snubber bore 164 therein, intersected at its upper and lower ends by crosswise extending flow connection passages 166 and 168, respectively. Contained within the snubber bore 164 and longitudinally reciprocable therein between limits, is a solid, cylindrical snubber piston 170. The snubber piston 170 has a carefully predetermined length and outside diameter relative to the length and inside diameter of the snubber bore 164, such as to provide therebetween a suitably restricted annular passage 172 for controlled flow of fluid pulsations therethrough. In the installation of pulsation snubber 146, the snubber piston 70 is free to reciprocate axially within the snubber cylinder bore 164 within the axial limits determined by the bottom surface wall at 174 of the crosswise extending flow connector passage 168 and the top surface 176 of the duct 144, and in the installation of pulsation snubber 152 the snubber piston 70 is free to reciprocate axially between the downwardly facing annular shoulder 178 formed at the juncture of the lower end of duct 154 and the upper end of the snubber cylinder 162, and the bottom surface wall 174 of the crosswise extending passage 168.

A number of snubber pistons of graduatingly different lengths and diameters are preferably made available for substitution in the snubber bores 164 whereby the degree of pressure pulsation dampening may be adjusted as required to meet conditions encountered in different installations and whereby the effective snubbing or dampening action of both pulsation snubbers 146 may be equalized.

The intermediate portion of the insert plug body 160 is provided with an externally threaded section 180 of slightly increased diameter relative to the upper, snubber cylinder portion 162, which makes readily detachable threaded connection with corresponding internally threaded, snubber plug insertion ports which enter the bottom side 14 of the base plate 10 as shown at 182 and 184 in FIGURE 1. The intermediate portion of the snubber insert plug body 160 is provided axially outwardly adjacent the beforementioned externally threaded section 180, with a smooth, cylindrical shank section 181 adapted to enter correspondingly, internally diametered entrance port portions 188 and 190 as shown in FIGURE 1. The shank portion 186 of each insert plug members 160 is provided with an annular groove 192 containing an O-ring seal member for providing a fluid-tight seal between the insert plug member 160 and the base plate 10.

The lower end of the insert plug body 160 is preferably provided with an externally knurled, cylindrical handle portion 194 of relatively increased outside diameter, for facilitating the insertion and withdrawal of the insert plug body 160 of the pulsation snubbers 146 and 152 from their respective snubber insert ports 182 and 184 in the base plate 10.

The base plate 10 is formed on its outer edge with a pair of outwardly extending base lugs as shown at 198 and 200, in FIGURE 2, having therein internally threaded sockets 202 and 204, respectively, for receiving bolts or machine screws 203 and 205, by means of which may be attached an enclosure, fragmentarily shown at 207, of an indicating or recording meter, or the like device (not shown), to be coupled to and actuated by the meter drive shaft 136.

*Operation*

Under usual and normal operating conditions, the two variable pressure signals, such as, for example, those obtained through suitable means from an orifice or venturi tube type of fluid flow measuring device, the differences of which pressure signals are to be sensed by the apparatus of this invention, are conducted through suitable piping which makes connection with the pressure connector ports 140 and 142 in the base plate 10. Normally, the pressure signals which are of the highest average pressure are applied to the pressure connector port 140 and the pressure signals which are of the lower average pressure are applied to the pressure connector port 142, although the reverse arrangement is permissible and occurs under some conditions.

Assuming the higher pressures to be applied to the pressure connector port 140, such pressures are communicated through duct 144, annular passage 172 formed between the snubber bore 164 and the snubber piston 170, of pulsation snubber 146, and thence through duct 148 into the base cavity 24. From the base cavity 24 the pressures are normally transmitted through the before-described, normally open pressure inlet control valve 125 and thence through the annular clearance space 123 between the valve stem 102 and the surrounding walls of the aperture 124, into the inner chamber portion 84 within the bellows assembly 56.

With the lower fluid pressures applied to the pressure connector port 142, such pressures are communicated through duct 150, annular passage 172 between the snubber bore 164 and the snubber piston 170 of pulsation snubber 152 and thence through duct 154 into the outer chamber portion 86 within the cover 16, exterior of the bellows assembly 56. The pressure differentials thus caused to be applied to the bellows assembly 56 normally operate, when the pressures applied to the connector port 140 are higher than the pressures applied to the connector port 142, to tend to expand or extend the length of the bellows assembly 56, with resultant upward movement of the bellows-closure plate 80 relative to the base plate 10. Such expansion of the bellows assembly 56 and upward movement of the bellows-closure plate 80 is transmitted through helical spring 119 to, and results in corresponding upward deflection of the center portion 97 of the flat spring 94 until the opposing downward force of the spring 94 and the upward force exerted by the bellows reaches equilibrium. The initial static compression of helical spring 119 is normally considerably in excess of the compressive force transmitted therethrough from the closure plate 80 to the center portion 97 of the flat spring 94 such as to maintain the travelling valve 101, comprising the annular valve seal member 118, closed relative to the valve aperture 82, whereby the valve stem 102, under such normal conditions, follows exactly the vertical movement of the bellows-closure plate 80. Such resulting vertical movement of the bellows-closure plate 80 is therefore transmitted through the helical spring 119 to the center portion 97 of the flat spring 94 and thence through the valve stem 102 and the lower end attachment lug 126 to the attached end of the flexible drive chain 130, thereby imparting corresponding rotational displacement to the drive sector 134 which is, in turn, transmitted to the meter drive shaft 136. Suitable torsion is maintained on the drive shaft 136 by means of a torsion bias spring (not shown) acting between the meter drive shaft 136 and the base plate 10, to maintain the flexible drive chain 130 in tension at all times whereby any lost motion is prevented.

The operations of the protective features of the apparatus of this invention are as follows:

If excessively high pressure is applied through the connector port 142 relative to the pressure applied to the connector port 140, such high pressure is conducted into the outer chamber portion 86 externally of the bellows assembly 56, and the lower pressure is conducted into the inner chamber portion 84 internally of the bellows assembly 56 and the bellows assembly 56 will be caused to contract upon itself to a fully collapsed condition a little beyond that approximated in FIGURE 3b. Under such condition all of the folds or convolutions 60 of the metal bellows body 58 are forced into fully closed, superposed, supporting contact upon one another, and with the closure plate 80 positioned at rest upon and supported by the upper surface 90 of the annular stop member 88. In such fully closed position, by reason of the before-described shapes of the folds or convolutions 60 of the metal bellows body 58, and by reason of their superposed uniform contact with one another, they are sufficiently mutually self-supporting to be able to withstand relative external pressures greatly in excess of that which would cause permanent deformation and damage to conventionally designed bellows. In event of a continued build-up of such pressure externally relative to the pressure internally of the fully collapsed bellows assembly 56, the resultant differential pressure thereby applied to the exposed area of the upper side of the valve seal member 118 and annular flange 114 of the travelling valve 101 may eventually become sufficient to overcome the static bias of helical spring 119 and some opposing force from the flat spring 94, and permit the travelling valve 101 to pop open sufficiently to relieve the excess pressure from the exterior to the interior of the bellows assembly 56.

If, however, excessively high pressure is applied to the pressure connector port 140 relative to the pressure applied to connector port 142, such high pressure is conducted into the base cavity 24, from where it will initially pass through the pressure inlet control valve 125 and through the annular space between the valve stem 102 and the surrounding walls of the aperture 124, into the inner chamber portion 84 within the belows assembly 56, causing the bellows assembly 56 to expand, thereby moving the closure plate 80 and the attached valve assembly 100, including the valve stem 102, upwardly relative to the base plate 10. When such resulting upward motion of the closure plate 80 reaches a predetermined limit, less than that which would result in permanent deformation and damage to the bellows body 58, the pressure inlet control valve 125 is moved by the valve stem 102 into its closed position, thereby cutting off further transfer of such pressure from the base cavity 24 into the inner chamber portion 84 within the bellows assembly 56 and preventing further introduction of pressure into the bellows assembly 56, and normally stopping further expansion of the bellows body 58 beyond the aforesaid predetermined limit.

However, should the pressure of the fluid thus entrapped within the bellows assembly 56 by such closure of the inlet control valve 125 continue to increase for any reason such as, for example, that which might result from a subsequent temperature increase, then such pressure increase within the bellows acting on the relatively large area of the annular closure plate 80 causes the bellows closure plate 80 to move upwardly a slight additional distance relative to the base plate 10. Since, by reason of the previous closure of the pressure inlet control valve 125, and the resultant restraint of further upward movement of the valve stem 102 and valve seal member 118, such additional upward movement of the closure plate 80 causes sufficient axial compression of the helical spring 119 to permit the closure plate 80 to move upwardly out of sealing contact with the thus restrained annular valve seal member 118, thereby opening the travelling valve 101 sufficiently to permit escape of pressure from within the bellows to the exterior thereof, sufficient to limit the differential pressure and resultant maximum expansion of the bellows. Since the effective area of the bellows closure plate is relatively large as compared to the effective area of the travelling valve 101 only a very slight further increase in pressure within the bellows assembly relative to the external pressure thereof following the closure of the inlet control valve 125 is sufficient to compress helical spring 119 sufficiently to effect the opening of the travelling valve 101 as before-described. Because of the beforementioned relatively large area of the closure plate 80 the bias of helical spring 119 can be made relatively high and sufficient to maintain the travelling valve 101 firmly closed and free from leakage, under all normal operating conditions. At the same time as beforementioned, only a very slight increase in differential pressure in a bellows-expanding direction, acting over the relatively large area of closure plate 80 is sufficient to overcome the relatively great closing biasing force of helical spring 119 and open the travelling valve 101.

It is to be noted, as an important feature of this invention, that the travelling valve 101 is so constructed and arranged, and the effective area of the annular closure plate 80 relative to the effective area of the valve flange 114, within the annular seal member 118 is such, that when excessive pressure occurs inside relative to the outside of the bellows, acting in a bellow-expanding direction, the travelling valve is caused to be opened by such differential pressure acting upon a relatively large area, namely the area of the annular closure plate 80, but when the excessive pressure is on the outside relative to the inside of the bellows, acting in a bellows-collapsing direction, then the travelling valve is caused to be opened by such differential pressure acting upon a much smaller area, namely only the area of the valve flange 114 within the annular seal member 118.

Therefore, when a differential pressure occurs in a bellows-expanding direction, which is the direction in which the bellows of the self-supporting kind employed in the present invention is most susceptible to damage, only a very slight further increase in differential pressure above a predetermined limit acting over the relatively large effective area of the annular bellows closure plate 80 is sufficient to apply the force required to open the travelling valve without danger of damaging the bellows, and thereby relieve the bellows of such potentially damaging differential pressure. However, when a differential pressure occurs in a bellows-collapsing direction which is sufficient fully to collapse the bellows to a self-supporting condition as herein shown and described, the bellows is thereby rendered capable of withstanding a considerable further increase in differential pressure in a collapsing direction, which is suffiicent to accommodate the relatively greater differential pressure required to be applied to the relatively smaller effective area of the travelling valve to apply the force required to open the travelling valve under the latter conditions.

Therefore, another important feature of the invention resides in the employment of the bellows-construction which is self-supporting when fully collapsed as hereinbefore described, in combination with the kind of travelling pressure relief valving mechanism hereindescribed for automatically limiting the expansion of the bellows to a predetermined limit.

Single bellows differential pressure sensors of the kind hereindescribed, whether or not the bellows contains the same fluid as that from which the differential pressures are desired, be it liquid or gas, as contrasted with the hereinbefore defined liquid-filled types, have high sensitivities and very short response times, and consequently tend to follow faithfuly every variation in the differential pressure pulsation signals applied to them. Such sensitivity would ordinarily be considered desirable. However, where such a sensitive pressure sensor is connected to a flow recorder, the resultant rapid motion of the pen or stylus in following such pulsations often results in a blurred, illegible graphical record commonly known in the art as a "painted" chart. It is therefore necessary under such conditions to provide suitable means for dampening and smoothing out the signal pressure pulsations applied through the pressure connections to the pressure-sensing device correspondingly to smooth out the recorded trace and thereby avoid such undesired recording effects as the beforementioned "painted" chart.

It is well known in the art that where flow restriction types of snubbing or dampening devices are employed in connection with a differential pressure-sensing device of the kind herein described, that pressure pulsation restricting means must be employed in both the high pressure and low pressure connection ports of the pressure-sensing device, and that such restriction means must effect precisely the same degree of dampening, otherwise gross inaccuracies in the differential pressure measurements will result, known in the art as "pumping up" the meter.

An advantage of the dampening or snubbing device herein disclosed resides in its provision of a restricted annulus 172 between the bore 164 of the snubber cylinder 162 and the outside diameter of the snubber piston 170 through which the pressure pulses pass. It is more practical in the dampening device hereindescribed than in conventional dampening devices heretofore employed to determine and to match or adjust these essential dimensions and therefore to provide and maintain substantially identical restriction and dampening effects in the two snubber devices 146 and 152 as required. When pressure signals are pulsating in character, the snubber pistons 170 are caused to reciprocate slightly in their snubber bores 164, thereby providing a continuous cleaning action to prevent accumulation or adherence of any particular or other contaminating matter which would otherwise tend to plug or change the effective size or action of the annular passages 172.

In the maintenance of a pressure-sensitive device of the kind hereindescribed, it is necessary frequently to check the calibration of the pressure-sensing device, the recorder apparatus connected thereto and the condition of the signal pressure pulsation snubbers. In making such checks it is necessary for the pulsation snubbers to be removed. An advantage of the construction and arrangement of the pulsation-snubbing apparatus hereindescribed resides in that the pressure snubber bodies can be readily and quickly removed from the lower side of the base plate 10 without disconnection or disturbance of any of the external pressure connections or any of the mechanical apparatus within the pressure-sensing device. Similarly, the cover 16 can be easily and quickly removed from the top of the base plate 10 thereby fully exposing substantially the entire pressure-sensitive mechanism, without disturbance of the mechanism or any of the pressure connections. The repair, or replacement of the bellows element, if ever necessary, may then be readily accomplished, in the field, with simple tools and without dismantling the pressure-sensor mechanism.

It is to be understood that the foregoing is illustrative only and that the invention is not limited thereby, but may include various modifications and changes made by those skilled in the art within the scope of the invention as defined by the appended claims.

I claim:
1. A differential pressure-responsive mechanism comprising in combination:
   a casing forming a normally closed chamber;
   bellows means mounted in said chamber, said bellows means having the stationary end thereof fixedly supported in said casing and having the movable end thereof closed by closure means for movement therewith in said chamber between extended and collapsed bellows means positions in response to varying differential pressures thereacross, said bellows means and said closure member dividing said chamber into separate, inner and outer closed chamber portions communicating with the inner and outer sides, respectively, of said bellows means;
   a first duct and a second duct entering said casing leading from the exterior thereof to said inner and outer chamber portions respectively, through which such differential pressures may be applied across said bellows means;
   a passage extending through said closure means between said inner and outer sides of said bellows means;
   a first, normally closed, one-way-opening travelling valve means operative for opening and closing said passage, said travelling valve means being so arranged, and having an effective area exposed to said differential pressures, such as to be urged thereby toward such normally closed position by pressure on said inner side of said bellows means, and to be urged toward an open position by pressure on the outer side of said bellows means;
   said travelling valve means thereby moving with said closure means while in such closed position;
   a second, normally open valve in said casing connecting said first duct with, and disconnecting said first duct from, said inner chamber portion when open and closed respectively;
   first coupling means interconnecting said travelling valve means and said second valve, for closing said second valve upon completion of movement of said travelling valve means together with said closure means a predetermined distance relative to said casing in a bellows means extending direction, and for limiting such movement of said travelling valve means to such predetermined distance, thereby opening said travelling valve means upon such movement of said closure means in excess of said predetermined distance;
   motion-transmitting means extending from the interior to the exterior of said casing;
   and means operatively connecting said travelling valve means to said motion-transmitting means for transmitting to the exterior of the casing motion bearing a predetermined relation to the travel of said travelling valve means.

2. Apparatus according to claim 1 and:
   resilient means biasing said travelling valve means toward said normally closed position.

3. Apparatus according to claim 1 in which said second valve means is a one-way-opening valve having an effective area exposed to pressures in said inner chamber portion and said first duct such as to be urged thereby, when closed, to remain closed when the pressure in said first duct is greater than the pressure on said inner side of said bellows means, and to be urged toward an open position when the pressure on said inner side of said position when the pressure on said inner side of said bellows means is greater than the pressure in said first duct.

4. Apparatus according to claim 3 and:
   resilient means biasing said travelling valve means toward said normally closed position.

5. Apparatus according to claim 3 in which
   said effective area of said second valve is substantially less than said effective area of said first valve means.

6. Apparatus according to claim 1 in which:
   said first coupling means includes rigid strut means fixedly interconnecting said travelling valve means and said second valve.

7. Apparatus according to claim 1 in which:
   said second coupling means includes means connected to and actuated by movement of said second valve.

8. Apparatus according to claim 1 and:
   resilient support means interconnecting said travelling valve means and said casing, guidingly supporting said travelling valve means for said movement thereof relative to said casing;
   and resilient bias means interconnecting said support means and said closure means and normally biasing said travelling valve toward its said normally closed position.

9. Apparatus according to claim 8 in which said resilient support means comprises:
   a substantially flat, generally disk-shaped, spiral spring body,
   means fixedly supporting the perimetrical portion of said spring body upon and at a fixed distance from said base plate, substantially coaxially of said bellows means,
   and means fixedly interconnecting said travelling valve means and the central portion of said spring body.

10. Apparatus in accordance with claim 1 in which said bellows means comprises a single bellows assembly comprising a plurality of coaxial, annular, end-to-end connected folds, so formed as to nest together upon one another in mutual, uniform contact with one another when said bellows assemby is in fully collapsed condition, whereby said bellows assembly is self-supportingly able to withstand increased external pressures without permanent deformation thereof.

11. A differential pressure-responsive mechanism comprising in combination:
 a base plate member;
 a dome-shaped cover member detachably attached to one surface of said base plate and thereby forming a normally closed chamber;
 bellows means in said chamber, said bellows means being supported therein with one end thereof fixed to the said one surface and having an opposite normally closed movable end thereof movable therein between extended and collapsed bellows positions in response to varying differential pressures thereacross, said bellows means dividing said chamber into separate inner and outer chamber portions communicating with the inner and outer sides, respectively, of said bellows means;
 a closed cavity in said base plate;
 a valve aperture in said base plate interconnecting said cavity and said inner chamber portion;
 a first, normally open valve in said cavity, movable between positions opening and closing said aperture;
 first and second connector ports formed in said base plate;
 a first duct in said base plate interconnecting said first port with said outer chamber portion;
 a second duct in said base plate interconnecting said second port with said cavity,
 whereby such differential pressures may be applied across said bellows means by way of said first duct and by way of said second duct, said cavity and said apertures;
 a second, normally closed, one-way-opening travelling valve in said normally closed movable end of said bellows means, operable for interconnecting and disconnecting said inner and outer chamber portions when said travelling valve is open and closed respectively, said second valve means being so arranged, and having an effective area exposed to said differential pressures such as to be urged toward said normally closed position by pressure on said inner side of said bellows means, and to be urged toward an open position by pressure on the outer side of said bellows means;
 coupling means extending through said valve aperture, rigidly interconnecting said first valve and said second, travelling valve for simultaneous movement thereof and operative to move said first valve thereby to a closed position upon movement of said travelling valve means together with said movable end of said bellows means a predetermined distance relative to said base plate in a bellows means extending direction, and to move said travelling valve means to a closed position upon movement of said movable end of said bellows in excess of said predetermined distance in a bellows means extending direction;
 motion-transmitting means extending from the interior of said mechanism;
 and means operatively connecting said travelling valve means to said motion-transmitting means for transmitting to the exterior of the mechanism motion bearing a predetermined relation to the travel of said travelling valve means.

12. Apparatus according to claim 11 in which said effective area of said movable end of said bellows means is substantially larger than the effective area of said travelling valve.

13. Apparatus in accordance with claim 11 in which said first and second connector ports are formed such as to enter the edge portion of said base plate.

14. Apparatus in accordance with claim 11 in which said bellows means comprises a single bellows assembly comprising a plurality of coaxial, annular, end-to-end connected folds, so formed as to nest together upon one another in mutual, uniform contact with one another when said bellows assembly is in fully collapsed condition, whereby said bellows assembly is self-supportingly able to withstand increased external overload pressures without permanent deformation thereof.

15. Apparatus in accordance with claim 14 and:
 support means positioned on said one surface of said plate, within said bellows means such as to supportingly contact the inner side of said movable end of said bellows means when said bellows means is in such fully collapsed condition.

16. Apparatus according to claim 13 and:
 a pair of fluid pressure pulsation-dampening means in said base plate, one of said dampening means being operatively connected in series with said first duct in said base plate and the other of said dampening means being operatively connected in series with said second duct in said base plate.

17. Apparatus according to claim 16 in which, said base plate is formed with a pair of ports entering the lower surface thereof into each of which one of said pulsation-dampening means removably extends, the inner end of each of said dampening means being formed with duct restriction means extending into flow-restricting communication with one of said first and second ducts.

References Cited

UNITED STATES PATENTS

| 2,128,265 | 8/1938 | Pechy | 73—392 |
| 2,147,031 | 2/1939 | Hastings et al. | 73—392 XR |
| 3,207,179 | 11/1962 | Klagues | 73—392 XR |
| 3,289,479 | 12/1966 | Tausch | 73—407 |

LOUIS R. PRINCE, *Primary Examiner.*

D. O. WOODIEL, *Assistant Examiner.*

U.S. Cl. X.R.

73—392; 92—34, 41, 43; 137—116.5